United States Patent

Ahn et al.

[15] 3,686,285
[45] Aug. 22, 1972

[54] ESTERIFICATION OF ORGANIC HALIDES WITH REDUCED ETHER PRODUCTION

[72] Inventors: Yong Kee Ahn, Wilkins Township, Allegheny; Barrett L. Cupples, Plum Boro; Clarence R. Murphy, Allison Park, all of Pa.

[73] Assignee: Gulf Research & Development Company, Pittsburgh, Pa.

[22] Filed: March 23, 1970

[21] Appl. No.: 21,624

[52] U.S. Cl.............260/493, 260/410, 260/410.9 R, 260/468 R, 260/471 R, 260/475 R, 260/484 P, 260/485 H, 260/485 L, 260/485 R, 260/491, 260/677 R, 260/683.15 D
[51] Int. Cl...............................................C07c 67/00
[58] Field of Search..260/410, 491, 493, 468, 410.9R, 260/475, 485

[56] References Cited

UNITED STATES PATENTS

| | | |
|---|---|---|
| 2,861,098 | 11/1958 | Di Sanza et al............260/493 |
| 2,296,823 | 9/1942 | Pollack et al..............260/493 |
| 1,459,971 | 6/1923 | Carter et al................260/491 |

*Primary Examiner*—Vivian Garner
*Attorney*—Meyer Neishloss, Deane E. Keith and Richard C. Gaffney

[57] ABSTRACT

An ester is prepared by reacting an organic acid, such as propionic acid, with an organic halide, such as n-octyl bromide, in the presence of water and an ether having a similar configuration and having twice as many carbon atoms as the organic portion of the organic halide.

10 Claims, 1 Drawing Figure

3,686,285
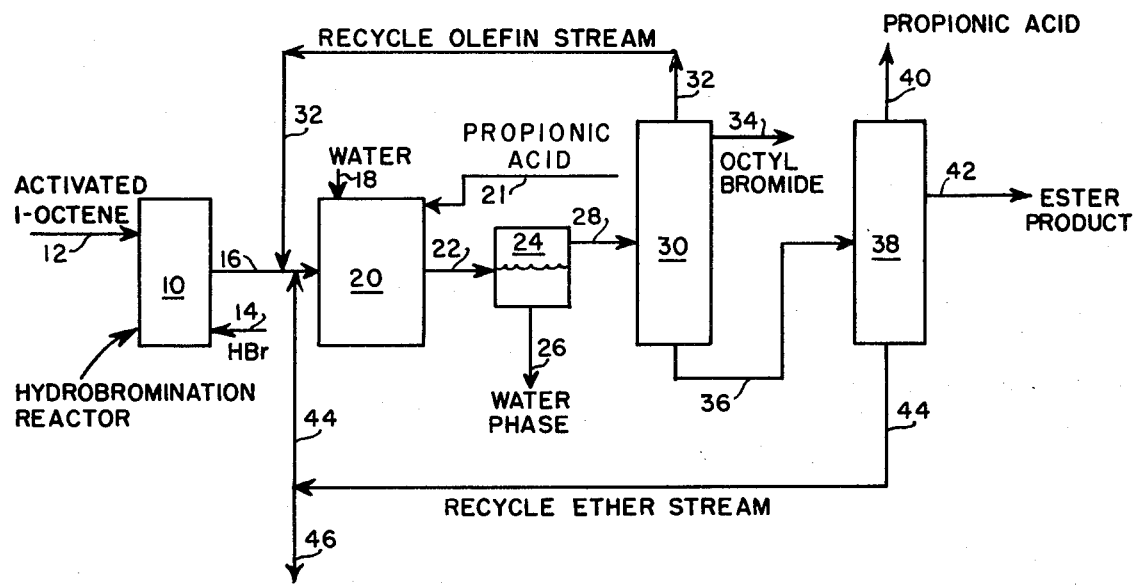
INVENTORS
BARRETT L. CUPPLES
CLARENCE R. MURPHY
YONG KEE AHN

ESTERIFICATION OF ORGANIC HALIDES WITH REDUCED ETHER PRODUCTION

This invention relates to a process for preparing esters, and in particular for improving the selectivity to the formation of esters by the reaction of an organic halide with an organic acid in the presence of water.

The reaction of organic halides with organic acids to produce the corresponding ester and water is described in Canadian Pat. No. 765,833 to William L. Walsh et al. The reaction can occur under a relatively broad temperature range of up to about 400° C. The production of the ester is increased by the presence of relatively large amounts of water. In addition, a considerable amount of alcohol product (i.e., 30 to 40 percent based on the total product) is made when the water is added. The alcohol is also a desirable product. For commercial purposes, it is desirable to operate in the higher temperature range of 170° C. and above in order to reduce reaction time and improve the space-time-yield of products from a given size reactor. Unfortunately, as the reaction temperature increases, side reactions increase which reduce the selectivity of the reaction to the desired esters and alcohols. One of these side reactions involves the formation of an ether by the reaction of the organic halide with alcohol product which in turn is formed by the reaction of the organic halide with water.

Attempts were made to convert the by-product ethers to alcohol and organic halide by reaction with dilute aqueous solutions of HBr (up to 13 weight percent HBr) at temperatures as high as 180° C., but with little success. Despite the fact that the ethers greatly resisted conversion to alcohol and organic halide in the presence of aqueous HBr solutions normally found in the product, it was surprising to find that the formation of the ethers can be effectively suppressed by recycling at least a portion of the ethers produced.

In accordance with the invention, an ester is prepared by a process which comprises:
reacting an organic acid selected from the group consisting of monobasic organic acids and polybasic organic acids;
with an organic halide selected from the group consisting of a primary alkyl halide, a secondary alkyl halide, a primary cyclic halide, a secondary cyclic halide and an olefin halide;
under esterification conditions and in the presence of water and an ether having a similar configuration and having twice as many carbon atoms as the organic portion of said organic halide and wherein the molar ratio of water to organic halide is from 25:1 to 150:1 and the molar ratio of the ether to the organic halide is at least 0.02:1.

The first reactant that is employed herein includes monobasic organic acids as defined in said Canadian Pat. No. 765,833, such as saturated straight chain aliphatic monobasic organic acids, that is, carboxylic acids, having from two to 30 carbon atoms, preferably from two to 22 carbon atoms; saturated branched chain aliphatic monobasic acids having from two to 30 carbon atoms, preferably from two to 22 carbon atoms, aromatic monobasic acids, saturated cyclic monobasic acids and straight and branched monobasic olefinic acids having from three to 22 carbon atoms, preferably from six to 22 carbon atoms. The first reactant can also include dibasic organic acids such as aliphatic straight and branched chain dibasic acids having from four to 22 carbon atoms, preferably from four to 18 carbon atoms, straight and branched chain olefinic dibasic acids having from four to 22 carbon atoms, preferably from four to 18 carbon atoms, cyclic dibasic acids having from five to 22 carbon atoms, preferably from five to 18 carbon atoms, and aromatic dibasic acids having from eight to 22 carbon atoms, preferably from eight to 18 carbon atoms; and polybasic acids having from four to 22 carbon atoms, preferably from four to 18 carbon atoms.

To react with the monobasic and dibasic acids defined above to produce the desired ester in accordance with the process defined and claimed herein, there must be employed an organic halide selected from the group consisting of primary straight and branched chain alkyl halides having from two to 30 carbon atoms, preferably from two to 22 carbon atoms; secondary straight and branched chain alkyl halides having from four to 22 carbon atoms, preferably from four to 12 carbon atoms; secondary cyclic halides having from three to 22 carbon atoms, preferably from three to 12 carbon atoms; primary straight and branched chain olefinic halides having from three to 22 carbon atoms, preferably from six to 22 carbon atoms; and secondary straight and branched chain olefinic halides having from three to 22 carbon atoms, preferably from six to 22 carbon atoms. Specific examples of each of the monobasic organic acids and organic halides that can be used herein are set forth in said Canadian Pat. No. 765,833 referred to above. Examples of dibasic acids that can be employed include specific examples of aliphatic straight and branched dibasic acids, such as succinic acid, glutaric acid, adipic acid, pimelic acid, azelaic acid, sebacic acid, suberic acid, methylsuccinic acid, dimethylsuccinic acid, methyladipic acid, etc.; specific examples of straight and branched olefinic dibasic acids, such as maleic acid, fumaric acid, methylmaleic acid, dimethylmaleic acid, ethylmaleic acid, methylfumaric acid, dimethylfumaric acid, chloromaleic acid, dichloromaleic acid, glutaconic acid, etc.; specific examples of cyclic dibasic acids, such as cyclohexane dicarboxylic acid, cyclopentane dicarboxylic acid, cyclododecane dicarboxylic acid, etc.; specific examples of aromatic dibasic acids, such as orthophthalic acid, nitrophthalic acid, tetrachlorophthalic acid, etc.; and specific examples of polybasic acids, such as tricarballylic acid, aconitic acid, citric acid, etc. Of the organic halides defined above, it is preferred to employ alkyl halides, particularly primary alkyl halides having from four to 12 carbon atoms. Of the alkyl halides, alkyl chlorides and alkyl bromides are preferred. Although it is preferred to employ the organic acids and the organic halides in approximately stoichiometric amounts, the molar proportions thereof can vary from about 10:1 to about 1:10.

The organic halide and the organic acid are brought together and react to form the desired ester plus hydrogen halide, for example, hydrogen bromide. The organic halide can, however, thermally decompose to form olefin and hydrogen bromide. In carrying out the reaction, therefore, it is desirable to have present an olefin having the same number of carbon atoms as the organic portion of said organic halide. In addition, said olefin should have a similar configuration to the organic portion of said organic halide. For example, aliphatic olefins should be employed when aliphatic organic halides are used as the charge stock. As a specific example, if 1-bromooctane, also referred to herein more simply as octyl bromide, is the organic halide employed, a suitable olefin would be 1-octene. Other monoolefins would be similarly derived from the other organic halides having at least two carbon atoms defined in the above said Canadian Pat. No. 765,833. Preferably, the olefins are those produced during the esterification reaction and are recycled to form a portion of the charge stock.

The molar ratio of the olefin to the organic halide in the charge stock is at least 0.1:1 and can be as high as 1:1. Preferably the molar ratio of olefin to organic halide is from 0.15:1 to 0.4:1.

The amount of ester produced and the inhibition of olefin are considerably enhanced by carrying out the reaction in the presence of water. The molar ratio of water to the organic halide reactant defined above can be from about 25:1 to about 150:1 and is preferably from about 40:1 to about 80:1.

An ether having twice as many carbon atoms as the organic portion of said organic halide is produced as a byproduct in the esterification reaction. This byproduct is undesirable as it reduces the selectivity of the process to the formation of the desired esters. It was believed that the byproduct ethers could be converted to alcohol and organic halide by reaction with aqueous solutions of HBr having an HBr concentration similar to that found in the product, i.e., 2 to 7 weight percent HBr. The organic halide could then be recycled for further reaction. It was found, however, that even at temperatures as high as 180° C. the conversion of ethers to alcohol and organic halide is very low using HBr aqueous concentrations as high as 13 weight percent. Thus, for some reason, the ethers produced in the reaction greatly resisted conversion by reaction with aqueous solutions of HBr similar to those produced. It was therefore believed that the recycling of the ether products to the esterification reaction would have little effect on their suppression since the concentration of HBr in the aqueous medium would be quite low. Contrary to expectations, the recycling of the ethers was effective in suppressing their further formation.

In accordance with the invention, the aqueous esterification reaction defined above is performed in the presence of an ether having twice as many carbon atoms as the organic portion of the organic halide. In addition, the organic portions of said ether should have a similar configuration to the organic portion of said organic halide in a manner similar to that defined for the olefins above. Preferably, the ethers employed are those produced in the reaction and which are recycled. The ratio of recycled ether to organic halide should be in the range of 0.02:1 to about 0.5:1 and is preferably in the range of 0.05:1 to 0.15:1.

In performing the reaction with the reactants defined above, the ether and the water can be brought together in any convenient manner. The temperature can be from about 170° C. to about 250° C., but preferably is about 180° C. to about 210° C. Pressures are not critical and any pressure is suitable, but in order to maintain water in the reaction zone a pressure of at least about 100 pounds per square inch gauge should be used. Generally, the reaction pressure is between 200 and 400 psig. The reaction time is similarly not critical and is dependent upon the other variables involved and on the amount of conversion desired. In general, the reaction time is about one minute to about four hours and is usually from about 15 minutes to about one hour.

The figure attached is a preferred method of operation of the process of this invention.

Referring to the figure, an alpha-olefin having preferably from four to 10 carbon atoms per molecule is passed through line 12 into hydrobromination reactor 10. The alpha-olefin, exemplified by 1-octene, is preferably prepared by the telomerization of a low molecular weight olefin, such as ethylene, under telomerization conditions in the presence of a catalyst such as a Group IIIA metal alkyl such as aluminum triethyl. Hydrogen bromide enters reactor 10 through line 14 and reaction is promoted by any suitable means to utilize substantially all of the HBr and olefin and to produce the desired primary alkyl addition reaction. Preferably, the alpha-olefin is preactivated with air under appropriate conditions so that no extraneously added catalyst is required to be inserted into reactor 10 to promote the desired anti-Markownikott addition reaction. The product from reactor 10 (without separation) is removed through line 16 and passed into the esterification reactor 20. Water enters esterification reactor 20 through line 18 and the organic acid, for example, propionic acid, required for esterification enters reactor 20 through line 21.

The product, consisting of the desired ester, unreacted alkyl bromide, olefin, ether and other side reaction products, leaves reactor 20 through line 22 and enters phase separator 24. The lower water phase is removed through line 26 and sent for further separation. An upper organic phase comprising the ester, propionic acid, olefin, etc., is removed through line 28 and enters distillation tower 30. Unreacted olefins are removed from tower 30 (or a series of towers if desired) through line 32 and are recycled to reactor 20 through line 16. Unreacted octyl bromide is removed as a side stream from tower 30 through line 34 together with some propionic acid and n-octyl alcohol. The desired ester product together with a small amount of propionic acid and $C_{16}$ ether are removed from tower 30 through line 36 and enter distillation tower 38. Any propionic acid present is removed first through line 40, it being understood all of the propionic acid may have been removed in the previous tower 30. The ester product is removed through line 42 or through line 40 if no propionic acid is present. The bottoms product containing the $C_{16}$ ether is removed through line 44 and is recycled to line 16 for entry into esterification reactor 20. Line 46 provides a means for removing a portion of the ether recycle stream if desired.

The process defined herein can be further illustrated by means of the following specific examples. The following procedure was employed in all runs unless otherwise stipulated. Into a continuous stirred tank reactor was introduced a mixture of 1-bromooctane, propionic acid and 1-octene together with water at a temperature from 180° C. to 200° C. at a pressure from 200 to 300 psig (slightly greater than the vapor pressure of water at the given reaction temperature). The product was continuously removed to a phase separator and the aqueous and organic layers were separately treated for recovery of their components. Unreacted olefins were recovered primarily from the upper organic layer and at least a portion were recycled. The 1-bromooctane used as the charge stock to the esterification reactor was the entire reaction product obtained by the hydrobromination of air activated 1-octene wherein the molar ratio of the HBr to 1-octene was substantially 1:1. This product had the composition as shown in Table I below.

TABLE I

|  | Mole Percent |
| --- | --- |
| Unreacted Octenes | 2.5 |
| 1-Bromooctane | 94.9 |
| 2-Bromooctane | 2.6 |
|  | 100.0 |

The 1-octene was obtained by the telomerization of ethylene.

A series of runs were made using the 1-bromooctane of Table 1 and wherein the concentration of ether in the feed stock was varied from 0 to 9.5 mole per cent. All of these runs were made under the same conditions including a temperature of 200° C., a molar ratio of water to propionic acid to 1-bromooctane of 65:4:1 for a residence time of 20 minutes. The results of these runs are shown in Table II below.

TABLE II

REACTION OF 1-BROMOOCTANE WITH PROPIONIC ACID AT 200° C.; 250 PSIG; FOR 20 MINUTES AT A MOLAR RATIO OF WATER TO PROPIONIC ACID TO 1-BROMOOCTANE OF 65:4:1

| Example No. | 1 | 2 | 3 | 4 | 5 | 6 | 7 |
| --- | --- | --- | --- | --- | --- | --- | --- |
| Feed Composition, Mole %: | | | | | | | |
| Olefin | 2.5 | 2.0 | 2.0 | 1.9 | 1.5 | 22.0 | 10.3 |
| Ether | 0 | 1.6 | 3.5 | 5.6 | 9.5 | 4.5 | 8.2 |
| Feed Mole Ratio: | | | | | | | |
| Olefin/RBR | 0.026 | 0.021 | 0.022 | 0.021 | 0.017 | 0.333 | 0.136 |
| Ether/RBR | 0 | 0.017 | 0.038 | 0.062 | 0.111 | 0.066 | 0.107 |
| Ether Formation: Conversion of 1-RBR to Ether: | | | | | | | |
| Mole % | 3.6 | 3.5 | 1.0 | 0.3 | 0.2 | −0.5 | −1.5 |
| Selectivity for Ether: % | 4.9 | 4.5 | 1.3 | 0.4 | 0.2 | −0.7 | −2.2 |

Referring to Table II, it can be seen from the first five examples that an increasing concentration of ether in the feed composition results in a decreased conversion of the 1-bromooctane to ether and a decreased selectivity of conversion of the 1-bromooctane to ether. The selectivity was calculated by dividing the conversion of 1-bromooctane to ether by the total conversion of 1-bromooctane.

EXAMPLE 6

Example 1 was repeated except the mole percent olefin in the feed composition was increased to 22 and the mole percent of dioctyl ether in the feed composition was 4.5. The conversion of 1-bromooctane to dioctyl ether was −0.5 mole percent and the selectivity of 1-bromooctane to dioctyl ether was −0.7 percent. The negative values indicate that some of the dioctyl ether which was added to the charge stock disappeared in the reaction. The results of this run are summarized in Table II above.

EXAMPLE 7

Example 6 was repeated except the mole percent olefin was 10.3 in the feed and the mole percent dioctyl ether was 8.2. The conversion of 1-bromooctane to dioctyl ether was −1.5, and the selectivity of conversion of 1-bromooctane to dioctyl ether was −2.2. The results of this run are summarized in Table II above.

A comparison of Examples 6 and 7 shows that for some unexplained reason decreased amounts of ether are produced when greater amounts of olefin are also present in the charge stock.

Resort may be had to such variations and modifications as fall within the spirit of the invention and the scope of the appended claims.

We claim:

1. A process for the preparation of an ester which comprises:
    reacting an aliphatic monobasic hydrocarbon carboxylic organic acid having from 2 to 22 carbon atoms;
    with an organic halide selected from the group consisting of a primary alkyl halide and a secondary alkyl halide;
    at a reaction temperature of 170° C. to 250° C. in the presence of water and a dialkyl ether having a similar configuration and having twice as many carbon atoms as the organic portion of said organic halide;
    and wherein the molar ratio of water to organic halide is from 25:1 to 150:1 and the molar ratio of the ether to the organic halide is at least 0.02:1.

2. A process according to claim 1 wherein the contact time is from 1 minute to 4 hours.

3. A process according to claim 1 wherein the organic halide is a primary alkyl halide.

4. A process according to claim 3 wherein the primary alkyl halide is a primary alkyl bromide.

5. A process according to claim 4 wherein the organic acid is propionic acid.

6. A process according to claim 1 wherein said reaction occurs in the added presence of a hydrocarbon olefin having a similar configuration and having the same number of carbon atoms as the organic portion of said organic halide.

7. A process for the preparation of an ester which comprises:
    reacting an aliphatic monobasic hydrocarbon carboxylic organic acid having from two to 22 carbon atoms with an organic halide selected from the group consisting of a primary alkyl halide and a secondary alkyl halide in the presence of water wherein the molar ratio of water to organic halide is from 25:1 to 150:1 and at a reaction temperature of 170° C. to 250° C. to form a reaction product;

separating a dialkyl ether having twice as many carbon atoms as the organic portion of said organic halide from said reaction product and recycling at least a portion of said ether to said reaction zone so that the ether to organic halide molar ratio is at least 0.02:1.

8. A process for the preparation of an ester which comprises:

reacting an aliphatic monobasic hydrocarbon carboxylic organic acid having from 2 to 22 carbon atoms with an organic halide selected from the group consisting of a primary alkyl halide and a secondary alkyl halide in the presence of water wherein the molar ratio of water to organic halide is from 25:1 to 150:1 and at a reaction temperature of 170° C. to 250° C. to form a reaction product;

separating a dialkyl ether having twice as many carbon atoms as the organic portion of said organic halide from said reaction product and recycling at least a portion of said ether to said reaction zone so that the ether to organic halide molar ratio is at least 0.02:1;

and separating a hydrocarbon olefin having a configuration similar to and having the same number of carbon atoms as the organic portion of said organic halide from said reaction product and recycling at least a portion of said olefin to said reaction zone so that the olefin to organic halide molar ratio is at least 0.1:1.

9. A process in accordance with claim 8 wherein the organic acid is propionic acid and the organic halide is 1-bromooctane.

10. A process in accordance with claim 8 wherein the molar ratio of said ether to said organic halide is from 0.05:1 to 0.15:1 and the molar ratio of said olefin to said organic halide is from 0.15:1 to 0.4:1.

* * * * *